United States Patent [19]

Kikuno

[11] Patent Number: 4,565,950
[45] Date of Patent: Jan. 21, 1986

[54] SERVO SYSTEM

[75] Inventor: Mitsutoyo Kikuno, Tokyo, Japan

[73] Assignee: Ricoh Company, Ltd., Tokyo, Japan

[21] Appl. No.: 548,795

[22] Filed: Nov. 4, 1983

[30] Foreign Application Priority Data

Nov. 9, 1982 [JP] Japan .................................. 57-196615
Nov. 26, 1982 [JP] Japan .................................. 57-208007

[51] Int. Cl.[4] .............................................. H02P 7/74
[52] U.S. Cl. ........................................ 318/85; 318/625
[58] Field of Search ............. 318/39, 41, 85, 101–103, 318/621, 625

[56] References Cited

U.S. PATENT DOCUMENTS

| 3,967,170 | 6/1976 | MacDonald et al. ................. 318/85 |
| 4,130,784 | 12/1978 | Ford ................................ 318/621 X |
| 4,408,281 | 10/1983 | Tack, Jr. et al. ................. 318/85 X |
| 4,414,495 | 11/1983 | Sumi et al. ...................... 318/625 X |
| 4,423,360 | 12/1983 | Pasterkamp .......................... 318/85 |

FOREIGN PATENT DOCUMENTS 1398410 6/1975 United Kingdom .................. 318/85

Primary Examiner—William M. Shoop, Jr.
Assistant Examiner—W. E. Duncanson, Jr.
Attorney, Agent, or Firm—David G. Alexander

[57] ABSTRACT

At least two movable objects are respectively driven to move by servo motors or the like in response to independent drive start signals. When each of the objects reaches a predetermined position, a sync signal associated therewith is generated. If a time lag exists between the generation of the sync signals, one of the drive start signals supplied to the servo motors is delayed by a period of time which corresponds to the time lag.

5 Claims, 4 Drawing Figures

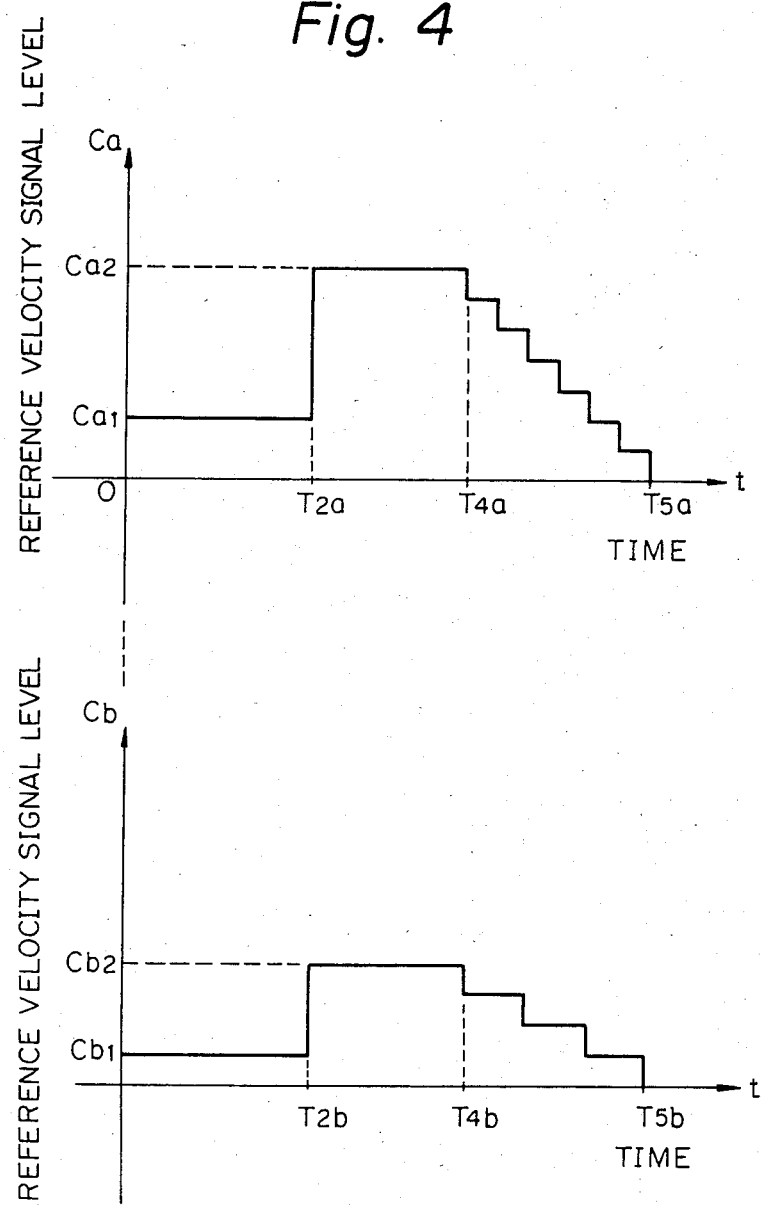

SERVO SYSTEM

BACKGROUND OF THE INVENTION

The present invention relates to a servo system for controlling a plurality of movable objects such that the objects travel timed to each other. The drive source for each of the object may be, but not limited to, a servo motor.

In a prior art servo system employed for the purpose described above, a time lag between two movable objects, for example, is compensated for by delaying the generation of a drive start signal for one of them by a predetermined period of time with respect to the generation of a drive start signal for the other.

In detail, where a control is performed such that at a time To when one b of the movable objects has run to reach a position xb, the other movable object a has also reached a position xa, the following equations hold:

$$\frac{\left\{xa - \frac{1}{2}\alpha a \left(\frac{Vfa}{\alpha a}\right)^2\right\}}{Vfa} + \frac{Vfa}{\alpha a} = TRa \quad \text{Eq. (1)}$$

and $$\frac{\left\{xb - \frac{1}{2}\alpha b \left(\frac{Vfb}{\alpha b}\right)^2\right\}}{Vfb} + \frac{Vfb}{\alpha b} = To \quad \text{Eq. (2)}$$

where $\alpha a$ and $\alpha b$ are accelerations acting on the objects a and b at a start or buildup of movement thereof, and Vfa and Vfb are target velocities for the constant velocity runs of the respective objects.

Therefore, the delay time $T_D$ is expressed as:

$$T_D = To - TRa \quad (3)$$

The prerequisite to be pointed out here is that the accelerations $\alpha a$ and $\alpha b$ be so selected as to set up a relation $TRa \leq To$ and insure a time margin up to the time To, which is produced by:

$$\frac{\left\{xa - \frac{1}{2}\alpha a \left(\frac{Vfa}{\alpha a}\right)^2\right\}}{Vfa}, \frac{\left\{xb - \frac{1}{2}\alpha b \left(\frac{Vfb}{\alpha b}\right)^2\right\}}{Vfb}$$

A problem encountered with the prior art system discussed above is that the accelerations $\alpha a$ and $\alpha b$ in the equations are susceptive to the characteristics of servo motors, frictions developing during the movement of the objects, ambient temperature, changes with the lapse of times, as well as other various factors.

SUMMARY OF THE INVENTION

It is therefore an object of the present invention to provide a servo system which controls a plurality of movable objects into synchronization during movement thereof.

It is another object of the present invention to provide a servo system which is capable of timing the movements of a plurality of objects with an economical and simple circuit construction.

It is another object of the present invention to provide a generally improved servo system.

A servo system for moving at least two movable objects to positions which are respectively predetermined therefor of the present invention comprises a drive start signal generator for generating independent drive start signals, a servo motor for driving the movable objects in response to the independent drive start signals, a pulse signal generator for generating pulse signals which respectively represent amounts of movement of the movable objects, a reference signal generator for generating independent reference velocity signals for moving the movable objects, an adder for adding the pulse signals to the reference velocity signals associated therewith, the servo motor being rotated at a velocity which corresponds to an output of the adder, a sync signal generator for generating independent sync signals when the movable objects reach the predetermined positions, a detector for detecting a time lag between the sync signals, and a prevention circuit for preventing the time lag from being developed.

The above and other objects, features and advantages of the present invention will become apparent from the following detailed description taken with the accompanying drawings.

BRIEF DESCRIPTION OF THE DRAWINGS

FIGS. 2-4 are timing charts demonstrating the operation of the present invention.

DESCRIPTION OF THE PREFERRED EMBODIMENT

While the servo system of the present invention is susceptible of numerous physical embodiments, depending upon the environment and requirements of use, a substantial number of the herein shown and described embodiment have been made, tested and used, and all have performed in an eminently satisfactory manner.

Figure 1:
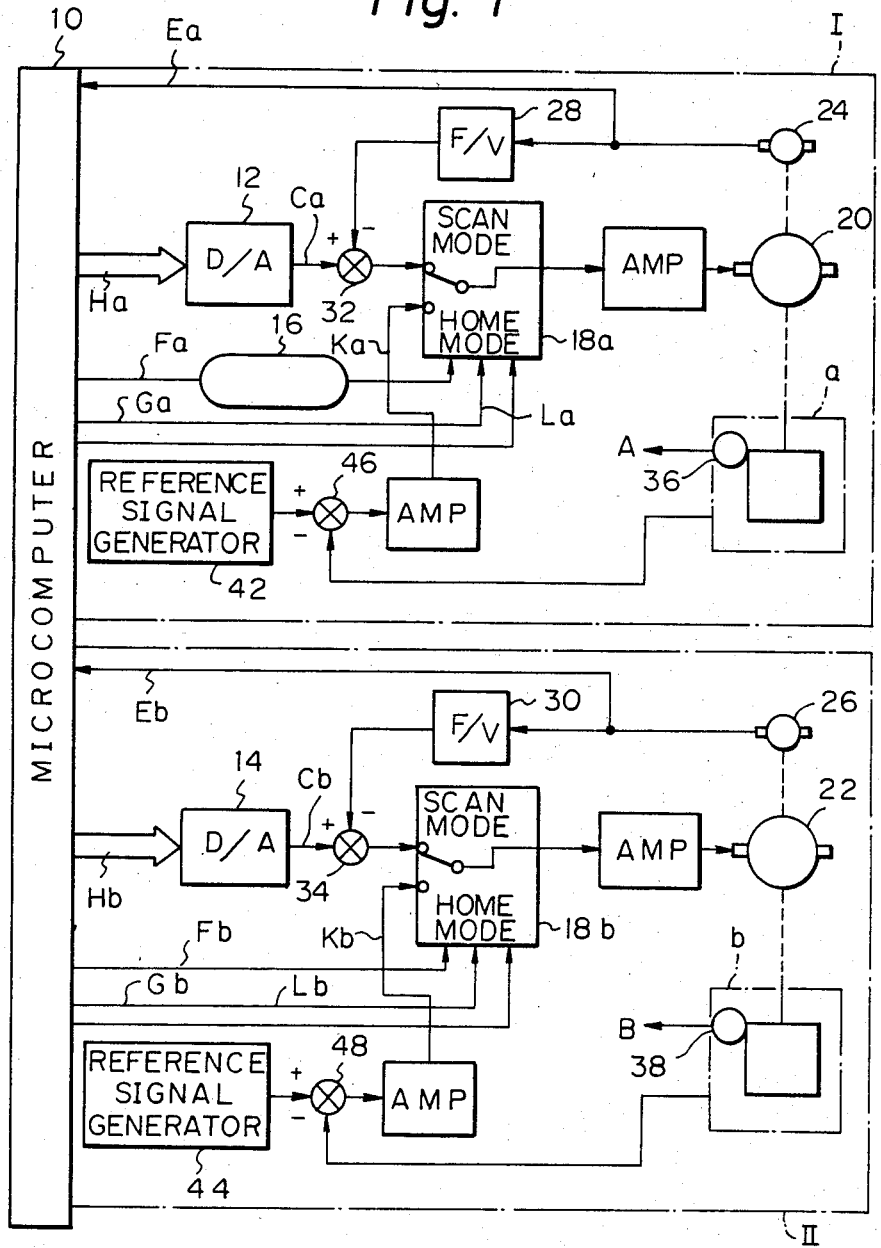
FIG. 1 is an electrical block diagram of a servo system embodying the present invention.

Referring to FIG. 1 of the drawings, a servo system embodying the present invention is shown in an electrical block diagram. The servo system generally comprises a first control circuit I for a movable object a and a second control circuit II for a movable object b. Description will be made taking for example a control over the objects a and b performed such that, as shown in FIG. 2, at a time To when the object b reaches a position xa.

Drive start instruction means (not shown) supplies a drive start instruction signal to a microcomputer 10 which is shared by the first and second control circuits I and II. In response to the instruction, the microcomputer 10 generates a drive start signal Fb for the object b, velocity data Ha and Hb, forward/reverse signals La and Lb, and mode select signals Ga and Gb each for selecting either a scan mode of operation or a home mode of operation. The velocity data Ha and Hb are fed to digital-to-analog (D/A) converters 12 and 14 respectively. The D/A converter 12 produces a reference velocity signal Ca and the D/A converter 14, a reference velocity signal Cb. The levels of these reference velocity signals Ca and Cb are represented by Ca1 and Cb1 in FIG. 4, which shows reference velocity levels at times T2a, T4a, T5a, T2b, T4b and T5b. In this instant, the forward/reverse signals La and Lb are "forward" and the mode select signals Ga and Gb, "scan mode". Then, on the lapse of a predetermined period of time after the generation of the drive start signal Fb for the object b, i.e., the time period $T_D$ produced by the Eq. (3), the drive start signal Fa for the object a is generated. The signal Fa is applied to a mode selector 18a after being delayed by the period of time $T_D$ by a delay circuit 16 (see FIG. 2).

Figure 2:
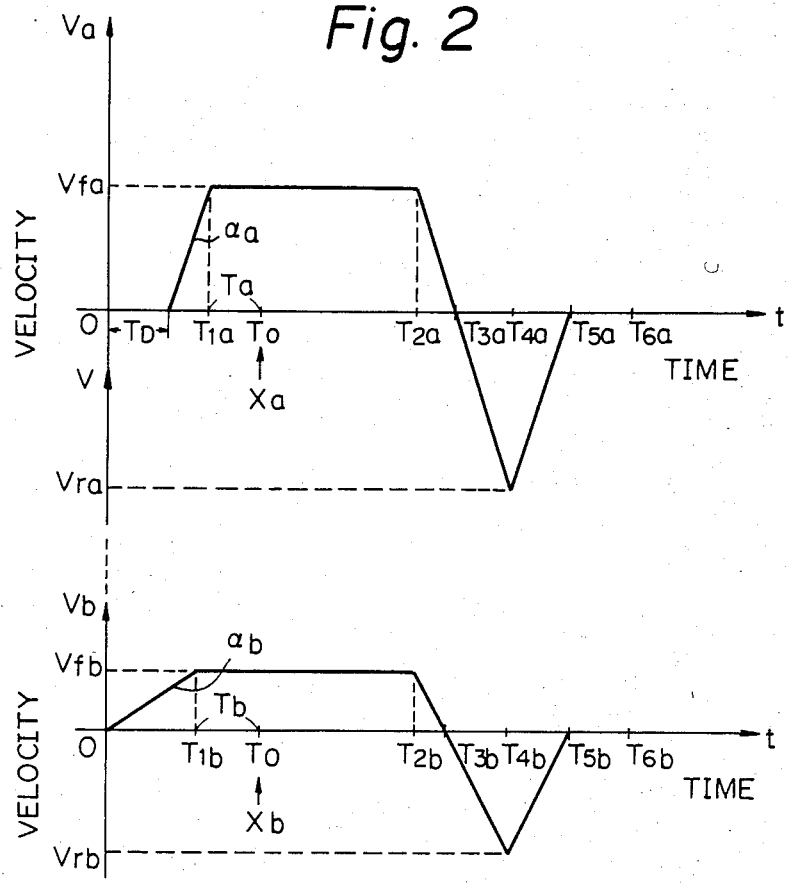

As shown in FIG. 2, the objects a and b accelerate toward target velocities Vfa and Vfb with accelerations αa and αb respectively. As a servo motor 20 associated with the object a is rotated, a pulse generator 24 generates feedback pulses Ea in interlocked relation with the motor rotation. Likewise, on the rotation of a servo motor 22, a pulse generator 26 generates feedback pulses Eb. The feedback pulses Ea and Eb are respectively fed to frequency-to-voltage (F/V) converters 28 and 38 as well as to the microcomputer 10. Each of the F/V converters 28 and 30 transforms the incoming feedback pulses into voltages. The outputs of the F/V converters 28 and 30 are respectively added to the previously mentioned reference velocity signals Ca and Cb by adders 32 and 34. The servo motors 20 and 22 are driven in response to summation outputs of the adders 32 and 34 respectively.

The pulse signals Ea and Eb are respectively counted by counters COEa and COEb which are individually installed in the microcomputer 10, although not shown in the drawing. The objects a and b enter into constant velocity runs at times T1a and T1b respectively. When times Ta and Tb have expired from the times T1a and T1b, i.e., at the sync time To, the objects a and b assume positions xa and xb respectively. At this time To, sync signal generators 36 and 38 each including a detector generate sync signals A and B respectively.

As soon as the number of each of pulses Ea and Eb counted in the microcomputer 10 reaches one which corresponds to a predetermined time T2a or T2b, its associated forward/reverse signal La or Lb turns into "reverse" and the associated velocity data Ha or Hb is changed. The reference velocity signal levels output from the D/A converters 12 and 14 at this instant are respectively represented by Ca2 and Cb2 in FIG. 4.

At this time, the servo motors 20 and 22 individually reverse the direction of their rotation so that the objects a and b are accelerated each toward a home position (start position). At the same time, the counters allocated to the pulses Ea and Eb start to be decremented.

Thereafter, when the counts of the pulse signals Ea and Eb have decreased to values which respectively correspond to times T4a and T4b, the velocity data Ha and Hb are sequentially varied in response to every predetermined numbers of pulses. Their D/A converted outputs are the stepwise signal level variations between times T4a and T5a and between the times T4b and T5b respectively. As the pulse counts coincide with values which correspond to predetermined times T5a and T5b respectively, the mode select signals Ga and Gb turn themselves from the "scan mode" to the "home mode".

When each of the objects a and b reaches its home position, a home position sensor (not shown) generates a home signal. The home signal is added to the reference signal output from the reference signal generator 40 or 42 by the adder 46 or 48. The servo motor 20 or 22 is controlled in response to an output of its associated adder 46 or 48, bringing the associated object a or b to a stop.

Figure 3:
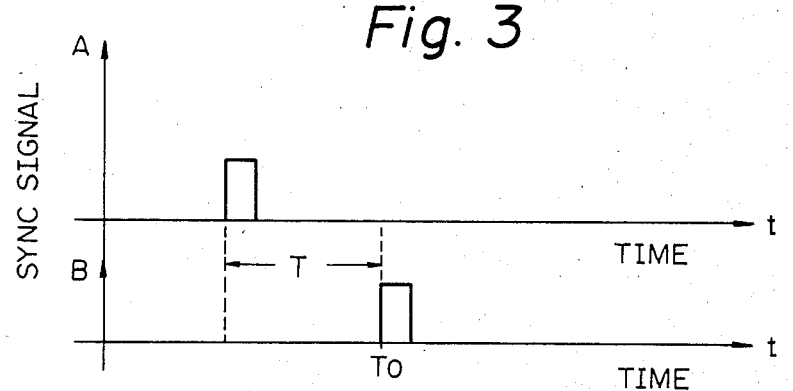

The servo system of the present invention completes one operation cycle thereof with the procedure described above. For a more accurate control over the objects a and b, an arrangement may be made such that the delay circuit 16 delays the drive start signal Fa for the object a to make the time lag T between the sync signals A and B which appear at the time To "O", illustrated in FIG. 3.

In summary, it will be seen that the present invention provides an economical and simple servo system which successfully times the movements of different movable objects accurately to each other without being effected by servo motor characteristics, frictions of the objects during movement, or the like.

Various modifications will become possible for those skilled in the art after receiving the teachings of the present disclosure without departing from the scope thereof.

What is claimed is:

1. A servo system for moving at least two movable objects to positions which are respectively predetermined therefor, said servo system comprising:
   drive start signal generator means for generating independent drive start signals which respectively cause the movable objects to start moving;
   servo motor means for driving the movable objects in response to the independent drive start signals;
   pulse signal generator means for generating pulse signals which respectively represent amounts of movement of the movable objects;
   reference signal generator means for generating independent reference velocity signals for respectively moving the movable objects;
   adder means for adding the pulse signals to the reference velocity signals associated therewith, the servo motor means being rotated at a velocity which corresponds to an output of the adder means;
   sync signal generator means for generating independent sync signals when the movable objects individually reach the predetermined positions;
   detector means for detecting a time lag between the sync signals; and
   prevention means for preventing said time lag from being developed.

2. A servo system as claimed in claim 1, in which the prevention means comprises delay means for delaying one of the drive signals by a period of time which corresponds to the time lag.

3. A servo system as claimed in claim 1, in which the drive start signal generator means and the detector means are constructed in a microcomputer.

4. A servo system as claimed in claim 1, further comprising a frequency-to-voltage converter means for converting the pulse signals into voltage signals.

5. A servo system as claimed in claim 1, in which the reference signal generator means comprises a digital-to-analog converter.

* * * * *